United States Patent [19]
Mitchell et al.

[11] Patent Number: 6,135,191
[45] Date of Patent: Oct. 24, 2000

[54] COLLAPSIBLE VEHICLE SUN SHADE

[75] Inventors: Edward David Mitchell, Los Angeles, Calif.; Roger Kim, Belleville, Mich.; John Charles Cook, Ventura; Scott Paul McManigal, Pacific Palisades, both of Calif.

[73] Assignee: Quaker State Investment Corporation, Wilmington, Del.

[21] Appl. No.: 09/148,956

[22] Filed: Sep. 8, 1998

[51] Int. Cl.⁷ ........................................ B60J 3/00
[52] U.S. Cl. ......................... 160/370.21; 160/134
[58] Field of Search ................ 160/370.21, 370.23, 160/84.07, 134, DIG. 2, DIG. 3; 296/97.7, 97.8; 135/900, 901, 902, 135, 133, 147

[56]        References Cited

U.S. PATENT DOCUMENTS

| | | | |
|---|---|---|---|
| 65,673 | 6/1867 | Holland et al. | |
| D. 236,868 | 9/1975 | Levy | D6/139 |
| D. 236,869 | 9/1975 | Levy | D6/139 |
| D. 236,870 | 9/1975 | Levy | D6/139 |
| D. 237,663 | 11/1975 | Levy | D6/139 |
| D. 247,276 | 2/1978 | Smith | D6/184 |
| D. 291,430 | 8/1987 | Vartanian et al. | D12/191 |
| D. 314,934 | 2/1991 | Howes | D12/155 |
| 368,506 | 8/1887 | Berrien . | |
| 1,018,498 | 2/1912 | Ilse . | |
| 1,412,716 | 7/1922 | Ramoall . | |
| 1,547,538 | 7/1925 | Vincent . | |
| 1,756,227 | 4/1930 | Torrent . | |
| 1,769,315 | 7/1930 | Schoenhard . | |
| 1,944,696 | 1/1934 | Reichl | 45/196 |
| 1,987,259 | 1/1935 | Koehler | 296/97 |
| 2,437,845 | 3/1948 | Wyeth | 296/84 |
| 2,546,438 | 3/1951 | Graeill | 160/327 |
| 2,561,188 | 7/1951 | Ferguson | 160/23 |
| 2,599,014 | 6/1952 | Pritchard | 296/44 |
| 2,599,066 | 6/1952 | Osborn | 160/368 |
| 2,624,406 | 1/1953 | Szychowski et al. | 160/368 |
| 2,646,118 | 7/1953 | Berty | 168/369 |
| 2,651,543 | 9/1953 | Chonoski et al. | 296/97 |
| 2,715,042 | 8/1955 | Lancaster | 296/84 |

(List continued on next page.)

FOREIGN PATENT DOCUMENTS

| | | | |
|---|---|---|---|
| 35113 | 8/1975 | Australia . | |
| 674216 | 11/1963 | Canada | 296/88 |
| 2313226 | 12/1976 | France . | |
| 2531382 | 2/1984 | France . | |
| 2584902 | 1/1987 | France . | |
| 2630977 | 11/1989 | France | B60J 3/02 |
| 704366 | 3/1941 | Germany . | |
| 11 40 475 | 6/1963 | Germany . | |
| 66 09 933 U | 12/1972 | Germany | B60J 3/02 |
| 5668 | 12/1978 | Israel . | |
| 5669 | 12/1978 | Israel . | |
| 5672 | 12/1978 | Israel . | |
| 5673 | 12/1978 | Israel . | |
| 5679 | 12/1978 | Israel . | |
| 42807 | 9/1959 | Poland . | |
| 73/3854 | 6/1973 | South Africa . | |
| 745006 | 12/1974 | South Africa . | |
| 12059 | 5/1975 | Spain . | |
| 205939 | 7/1966 | Sweden . | |
| 673439 | 3/1990 | Switzerland . | |
| 1288 | of 1853 | United Kingdom . | |
| 110573 | 10/1917 | United Kingdom . | |
| 200635 | 7/1923 | United Kingdom . | |
| 859268 | 1/1961 | United Kingdom . | |
| 1106275 | 3/1968 | United Kingdom . | |

OTHER PUBLICATIONS

U.S. application No. 09/094,743, Mitchell et al., filed Jun. 15, 1998.

*Primary Examiner*—David M. Purol
*Attorney, Agent, or Firm*—Jenkens & Gilchrist, a Professional Corporation

[57]           ABSTRACT

A collapsible vehicle sun shade assembly is described that has a sheet of flexible fabric material, with at least one non-central hub. Hingedly attached to the non-central hub are at least four support members. The at least four support members are secured to positions along the outer edge of the flexible fabric sheet.

25 Claims, 3 Drawing Sheets

U.S. PATENT DOCUMENTS

| | | | |
|---|---|---|---|
| 2,736,375 | 2/1956 | Rupert | 160/370.21 X |
| 2,804,135 | 8/1957 | Sutton | 160/105 |
| 2,806,809 | 9/1957 | Schuh | 154/46 |
| 2,821,248 | 1/1958 | Irvine | 160/368 |
| 2,855,241 | 10/1958 | Walter | 296/97 |
| 2,897,002 | 7/1959 | Yovich | 160/134 X |
| 2,922,676 | 1/1960 | Czajkowski | 296/97 |
| 2,991,119 | 7/1961 | Young | 296/97 |
| 3,003,812 | 10/1961 | Haugland | 296/97 |
| 3,042,445 | 7/1962 | Lamar | 296/97 |
| 3,069,021 | 12/1962 | Gray . | |
| 3,156,497 | 11/1964 | Lessard | 160/370.21 X |
| 3,184,264 | 5/1965 | Ealey et al. | 296/95 |
| 3,252,468 | 5/1966 | Militano . | |
| 3,343,868 | 9/1967 | Manookian | 296/97 |
| 3,363,666 | 1/1968 | Hodgson et al. | 160/23 |
| 3,371,955 | 3/1968 | Herrington | 296/97 |
| 3,373,792 | 3/1968 | Lessard | 160/370.21 |
| 3,412,506 | 11/1968 | Shiota | 49/82 |
| 3,690,080 | 9/1972 | Dillard | 52/108 |
| 3,804,456 | 4/1974 | Boyle | 296/97 E |
| 3,880,461 | 4/1975 | Flanagan | 296/95 C |
| 4,202,396 | 5/1980 | Levy | 160/107 |
| 4,261,649 | 4/1981 | Richrad | 350/276 |
| 4,442,881 | 4/1984 | Monteath . | |
| 4,618,132 | 10/1986 | Kimura et al. | 296/97 |
| 4,635,993 | 1/1987 | Hooper et al. | 296/95 |
| 4,724,181 | 2/1988 | Mingenback . | |
| 4,749,222 | 6/1988 | Idland | 296/97 D |
| 4,758,041 | 7/1988 | Labeur | 296/97 G |
| 4,762,358 | 8/1988 | Levosky et al. | 296/97 G |
| 4,815,784 | 3/1989 | Zheng | 296/97.7 |
| 4,836,232 | 6/1989 | De Rosa et al. | 135/904 |
| 4,848,825 | 7/1989 | Niernberger | 296/95.1 |
| 4,862,943 | 9/1989 | Shafia | 160/370 |
| 4,863,210 | 9/1989 | Kenon | 296/136 |
| 4,869,542 | 9/1989 | Lin et al. | 296/97.8 |
| 4,874,026 | 10/1989 | Worral | 160/23.1 |
| 4,898,224 | 2/1990 | Woodworth | 160/310 |
| 4,902,062 | 2/1990 | Moluntska et al. | 296/97.4 |
| 4,923,239 | 5/1990 | Wiscusen et al. | 296/97.7 |
| 4,958,880 | 9/1990 | Champane | 296/97.7 |
| 4,964,667 | 10/1990 | Reis et al. | 296/95.1 |
| 5,004,285 | 4/1991 | Bennet | 296/1.1 |
| 5,024,262 | 6/1991 | Huang | 160/370.2 |
| 5,035,460 | 7/1991 | Huang | 296/95.1 |
| 5,036,898 | 8/1991 | Chen et al. | 160/23.1 |
| 5,042,866 | 8/1991 | Cody | 296/97.4 |
| 5,076,633 | 12/1991 | Hsu et al. | 296/97.4 |
| 5,085,473 | 2/1992 | Yang | 296/141 |
| 5,116,273 | 5/1992 | Chan | 160/370.2 |
| 5,135,279 | 8/1992 | Beatty | 296/97.1 |
| 5,158,334 | 10/1992 | Felland | 296/97.4 |
| 5,165,748 | 11/1992 | O'Connor | 296/97.6 |
| 5,213,147 | 5/1993 | Zheng | 160/370.2 |
| 5,253,695 | 10/1993 | Nenstiel | 160/370.2 |
| 5,314,226 | 5/1994 | Tovar | 296/97.7 |
| 5,355,903 | 10/1994 | Haddad et al. . | |
| 5,356,191 | 10/1994 | Sheehan | 296/95.1 |
| 5,379,822 | 1/1995 | Lenetz | 160/370.21 |
| 5,495,884 | 3/1996 | Shikler | 160/120 |
| 5,553,908 | 9/1996 | Shink | 296/978 |
| 5,562,142 | 10/1996 | Ziel | 160/370.21 |
| 5,611,364 | 3/1997 | Woods et al. . | |
| 5,632,318 | 5/1997 | Wang | 160/370.21 |

COLLAPSIBLE VEHICLE SUN SHADE

FIELD

The present invention relates to collapsible sun shades for protecting the interior of vehicles against the harmful effects of prolonged exposure to the sun. More particularly, the present invention relates to collapsible sun shades including a sheet which is supported in its open or expanded configuration by a set of support members.

BACKGROUND

In recent years, collapsible vehicle sun shades that are designed to be unfolded and placed behind the windshield or behind the windows of vehicles have dramatically increased in use. These collapsible vehicle sun shades act as a barrier to the harmful effects of prolonged exposure to the sun. It is well known to owners and operators of vehicles that prolonged exposure to the sun's rays, particularly when the vehicle is parked, causes both heat buildup within the vehicle and undesired fading, cracking or weathering of the materials used for enhancing the appearance of the interior of the vehicle.

Commonly available collapsible vehicle sun shades include inexpensive folded cardboard which has been specially cut and scored for placement behind vehicle windshields such as shown in U.S. Pat. No. 4,202,396 to Levy. Other types of collapsible vehicle sun shades include devices which expand like fans into a semicircle or sun shades made from fabric attached to loops of coiled spring-like wire. Unfortunately, these prior art sun shades are usually available in a single size. This single size may or may not fit the windshield of a particular vehicle or may allow the sun's rays to pass around its edges. Accordingly, there is a need in the art for a simple design for a collapsible vehicle sun shade assembly which can be readily manufactured to fit vehicle windows irrespective of their size and shape.

SUMMARY

The present invention describes an assembly for a collapsible vehicle sun shade which can be readily manufactured to fit vehicle windows having variable sizes and shapes. Included in the collapsible vehicle sun shade assembly of the present invention is a sheet of flexible fabric, an off-center hub, and at least four support members. The support members are connected to one end to the off-center hub and secured at their opposite ends to positions along the outer edge of the flexible fabric sheet.

In another aspect of the present invention, the collapsible vehicle sun shade includes a sheet of flexible fabric, one or more hubs located proximate the edges of the sheet of flexible fabric, and at least four support members connected to the hubs by releasable locking joints or hinges.

In use, the collapsible vehicle sun shade according to the present invention may be releasably locked in an open or extended configuration by the support members when the flexible fabric sheet is extended over the inside of a vehicle windshield or window. When not in use, the collapsible vehicle sun shade assembly according to the present invention permits rearrangement a closed configuration where the flexible fabric sheet is collapsed and gathered together by the support members.

BRIEF DESCRIPTION OF THE DRAWINGS

A better understanding of the collapsible vehicle sun shade assembly of the present invention may be had by reference to the drawing figures, wherein.

DETAILED DESCRIPTION OF THE EMBODIMENTS

Figure 1:
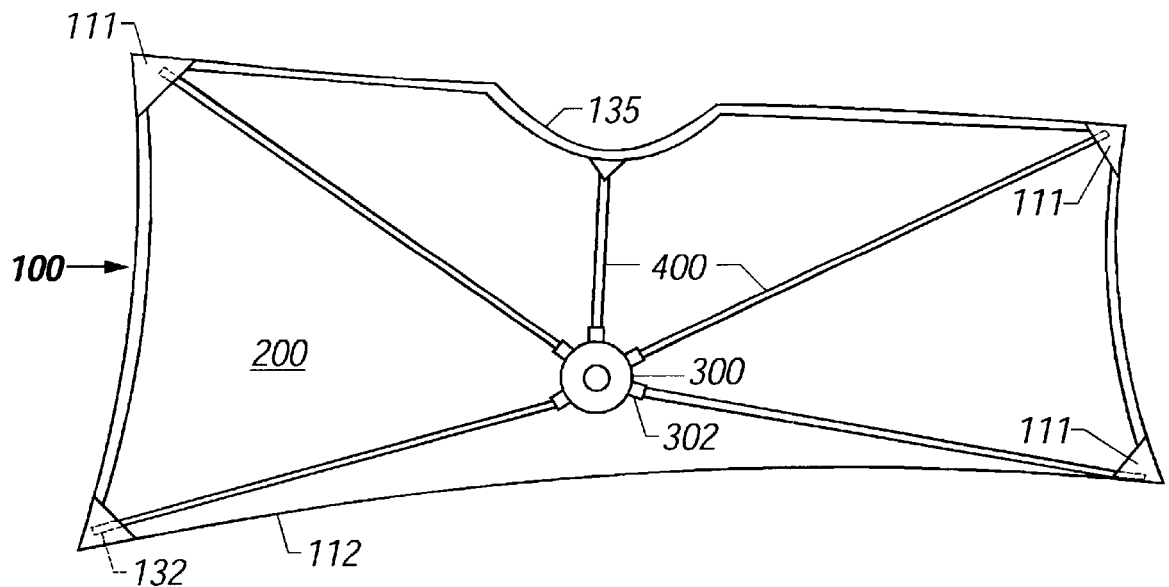
FIG. 1 is a perspective view of a first embodiment of a collapsible vehicle sun shade according to the present invention.

The collapsible vehicle sun shade assembly of the present invention includes a flexible fabric sheet which is supported in its open or extended configuration by at least four support members which extend outwardly from an off-center hub. The connection of the support members to the hub enables the vehicle sun shade assembly to move from an open to a closed configuration. The embodiments of the collapsible vehicle sun shade assembly of the present invention are light weight, easily storable, durable, and can be made in a variety of sizes to fit a wide variety of window shapes and sizes.

In the preferred embodiment of the present invention, the flexible fabric sheet which blocks the sun's rays is made from Nylons or a similar material and is cut to have a perimeter substantially matching the perimeter of the window in which the collapsible sun shade is to be mounted. Preferably the flexible fabric sheet has a silver coloring or a reflective coating suitable for reducing the harmful effects of sun light; for example, a polyurethane coating. Those of ordinary skill in the art will understand that the flexible fabric sheet may be made from a wide variety materials which are suitable for reflecting both light and heat radiation.

The at least one hub of the collapsible vehicle sun shade assembly may be made of a resilient material such as rubber or a flexible polymer. The selected rubber or flexible polymer should be able to withstand temperatures ranging from about −100° F. to about 200° F. without losing its strength or structural integrity by becoming soft or brittle.

Preferably, the support members are made of a resilient material with spring-like qualities. Such materials include both metallic and non-metallic materials such as plastics. The support members can have a variety of cross sections including solid rods, tubes, flat beams or rods within tubes. Like the hubs, the support members should be able to withstand temperatures ranging from about −100° F. to about 200° F. without losing their strength or structural integrity by becoming soft or brittle.

In general, the flexibility and resiliency of the hubs and the support members over a wide range of temperatures can be utilized to provide a collapsible vehicle sun shade that may be biased into an open or extended configuration when in use and folded into a closed or collapsed configuration for convenient storage when not in use.

The collapsible vehicle sun shade assembly of the present invention may also include hubs and support members that are made from substantially rigid materials. When substantially rigid materials are used the hubs may include releasable locking joint mechanisms at the connection between the hub and each support member. These releasable locking joint mechanisms enable the sun shade to be releasably locked into an open or extended configuration. Such releasable locking joint mechanisms may include hinges that releasably snap between various positions, or spring biased hinges.

Relative movement between the hubs and the support members may be provided by a wide variety of hinges or joints. These hinges or joints may be located on the hubs, on the ends of the support members, or as discrete individual components which fit between and connect the hubs to the support members.

If desired, the hubs may be attached to the flexible fabric sheet. When two or more hubs are used, the support members are connected to the two or more hubs so that they can only be pivoted between an open or extended configuration and a closed or collapsed configuration of the sun shade. In the closed or collapsed configuration, the support members are positioned to move the fabric sheet, from its open or extended configuration to a more compact arrangement for storage. In the open or extended configuration, each of the support members is pivoted into substantially the same plane to extend the flexible fabric sheet to the edges of the window.

Preferably, the length of at least one support member is longer than an adjacent length of the flexible fabric sheet measured from the hub to the secured position of the support member at either the corner or the edge of the flexible fabric sheet. This difference in length will cause one or more support members to bow slightly when the collapsible vehicle sun shade is in its open or extended configuration.

When all of the support members are pivoted into substantially the same plane, the support members which are longer than the adjacent flexible fabric material can be extended to bow in a direction opposite from a closed configuration of the sun shade. As the flexible fabric sheet is extended in this manner, the collapsible vehicle sun shade assembly is releasably locked into an open position by the bowing of one or more support members.

In additional embodiments of the present invention the collapsible vehicle sun shade assembly, in its open or extended position, describes a perimeter, periphery or outer edge which may be one of a multitude of shapes, to include squares, rectangles, trapezoids, circles, ovals, or a unique vehicle windshield or window shapes.

The hubs and support members included in the embodiments of the present invention may be made from cushion-like materials, such as polymer foams. Alternatively, the hubs and support members may be covered with padding. The use of cushion-like materials for padding enables the sun shade to be used as a head rest, arm rest or foot rest in its closed or collapsed configuration.

Referring to FIG. 1, a perspective view is shown of a first embodiment of the collapsible vehicle sun shade assembly 100 according to the present invention is shown in its open or extended configuration. In general, the sun shade 100 includes a flexible fabric sheet 200 that is supported by an off-center generally cylindrical hub 300. The hub 300 provides a hinged connection for the five radially extending support members 400. The five radially extending support members 400 are hingedly mounted 302 to the off-center, generally cylindrical hub 300 and extend to attachment positions 132 on the outer periphery or perimeter 112 of the flexible fabric sheet 200. The attachment positions 132 may be enclosed by pockets 111 that are stitched onto the flexible fabric sheet 200. Those of ordinary skill in the art will understand that the support members 400 may be attached to the fabric sheet 200 by a variety of methods such as by the use of rivets or glue (not shown). The sun shade 100 is collapsed into a storable configuration by pivotal movement of the support members 400 with respect to hub 300.

Figure 2:
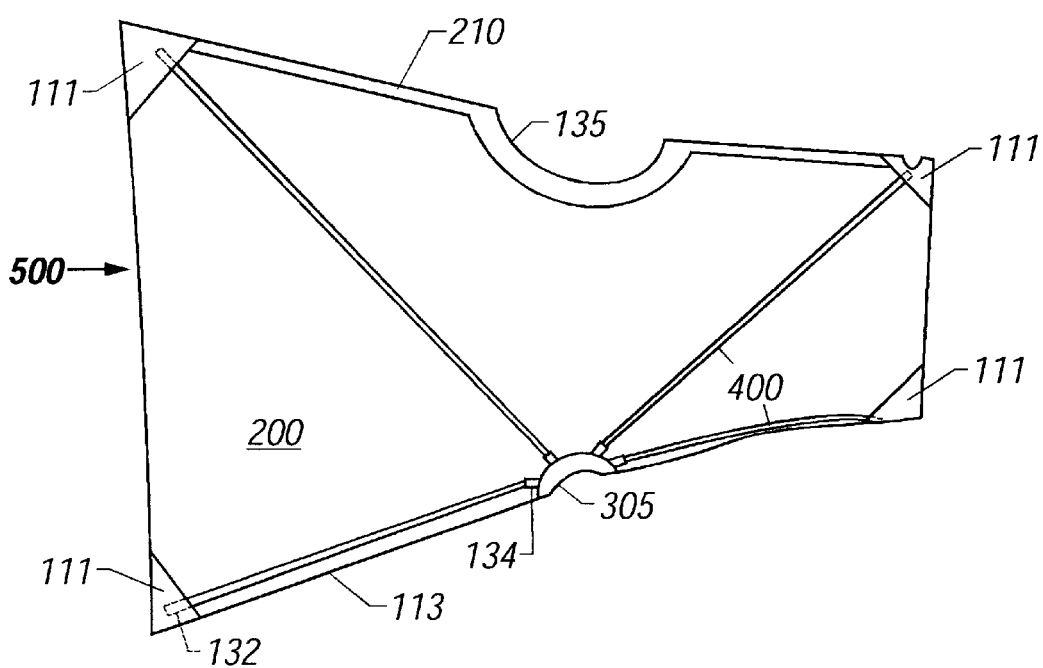
FIG. 2 is a perspective view of a second embodiment of the collapsible vehicle sun shade.

Referring to FIG. 2, a perspective view is shown of a second embodiment of the collapsible vehicle sun shade assembly 500 of the present invention. In this embodiment, just as in the first embodiment 100 shown in FIG. 1, the flexible fabric sheet 200 has a substantially rectangular shape which also includes a taper area 135 on its upper edge 210 which is sized to fit under a rear view mirror or the like. The four support members 400 are connected to a semicircular hub 305 that is secured to the flexible fabric sheet 200 at substantially the center of the lower edge 113 of the flexible fabric sheet 200. If desired, a hem may be sewn along the outer perimeter of the fabric sheet 200. The support members 400 are connected by receptacles 134 flexibly connected to the semicircular hub 305. It is the flexible connection of the receptacles 134 to the hub 305 that permits the reconfiguration of the collapsible vehicle sun shade assembly into its storable configuration.

In the embodiment shown in FIG. 2, there are four support members 400. Each of the four support members 400 extends outwardly from the receptacles 134 on the semicircular hub 305 to a connection point 132 covered by a corner pocket 111. The support members 400 may be connected to the fabric sheet 200 at the corners by a variety of different methods to include rivets, screws, staples, glue, sonic welding and the like.

Figure 3:
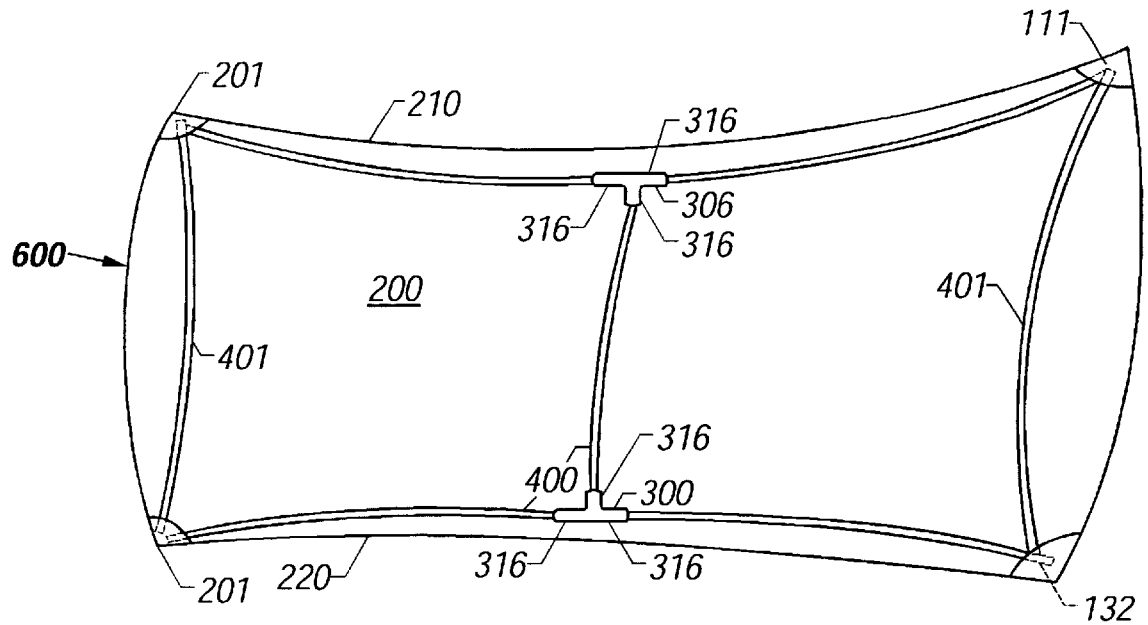
FIG. 3 is a perspective view of a third embodiment of the collapsible vehicle sun shade.

Referring to FIG. 3, a third embodiment 600 of the collapsible sun shade of the present invention is shown. The two hubs 306 are T-shaped pieces located in close proximity to the top edge 210 and the bottom edge 220 of the flexible fabric sheet 200. The two T-shaped hubs 306 are made of a resilient material such as plastic or rubber. The seven support members 400 are connected to the hubs 306 by simply placing the support members 400 into receptacles 316 on the hubs 306. Since the two hubs 306 are made from a resilient material, the sun shade 600 is biased in an open position. Unlike the prior embodiments, two of the support members 401 extend between the corners 201 of the flexible fabric sheet 200. As in FIG. 2, five of the support members 400 extend from the hubs 306 to a corner pocket 111 where they may be attached 132 to the flexible fabric sheet 200.

Figure 4:
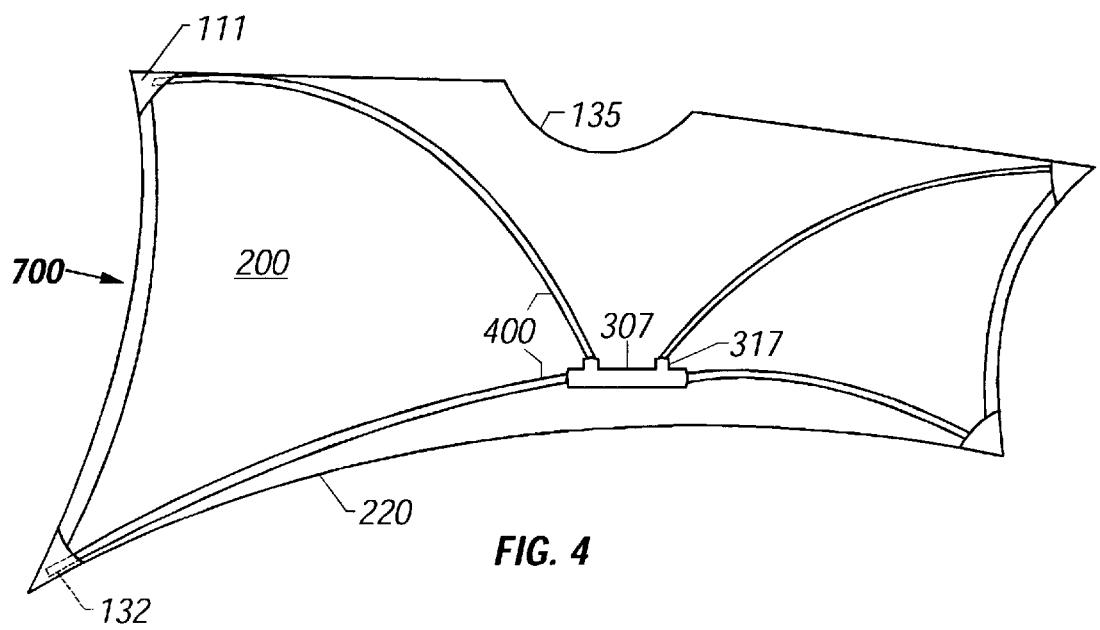
FIG. 4 is a perspective view of a fourth embodiment of the collapsible vehicle sun shade.

Referring to FIG. 4, a perspective view is shown of a fourth embodiment 700 of the collapsible flexible sun shade assembly 700 of the present invention. The single U-shaped flexible hub 307 is located near the lower edge 220 of the flexible fabric sheet 200. Like the embodiment 600 shown in FIG. 3, the four support members 400 are connected to the flexible hub 307 by placing the support members 400 into receptacles 317 in the flexible hub 307. As in prior embodiments, the support members 400 extend from the flexible hub 307 to a corner pocket 111 where they may be attached 132 to the flexible fabric sheet 200.

Figure 5:
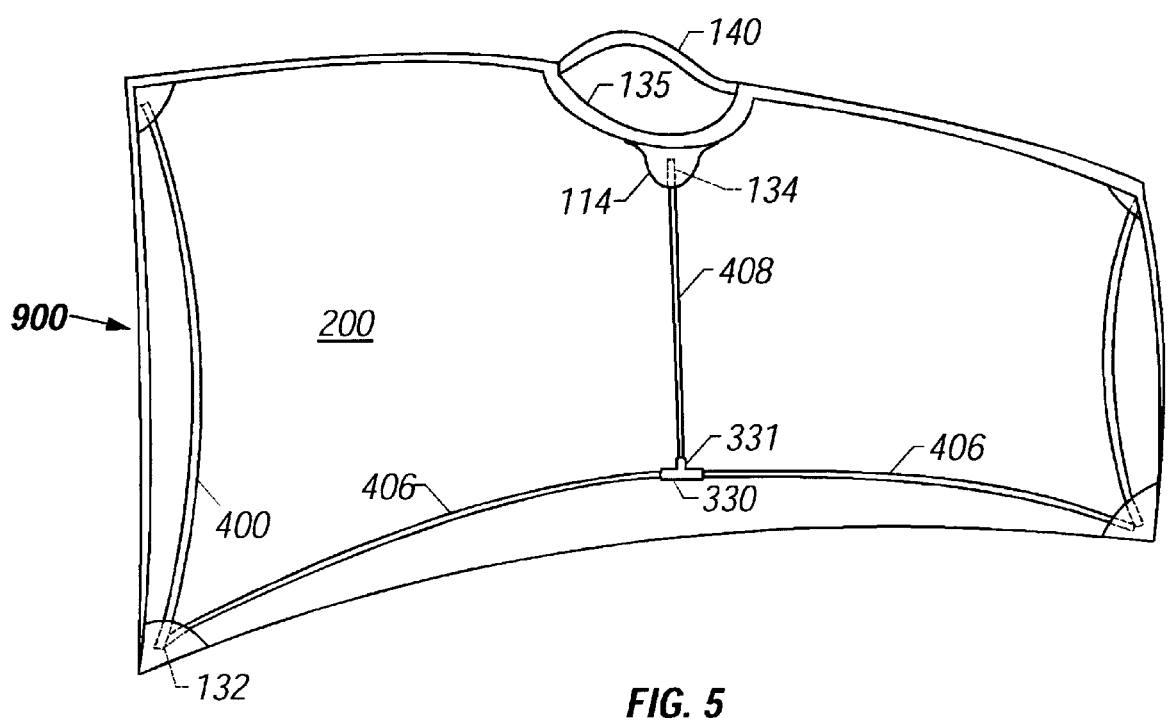
FIG. 5 is a perspective view of a fifth embodiment of the collapsible vehicle sun shade.

Finally, referring to FIG. 5, a perspective view is shown of a fifth embodiment 900 of the collapsible sun shade of the present invention. A single flexible T-shaped hub 330 is located just below the center of the flexible fabric sheet 200. Two lower support members 406 extend from receptacles 331 in the flexible hub 330 to the attachment points 132 under the covering pockets 111 where the support rods 406 are connected to the lower corners of the flexible fabric sheet 200. A single support member 408 extends to a connection point 134 and covering pocket 114 on the upper edge of the sheet 200. As shown in the embodiment illustrated in FIG. 3, two side support rods 410 extend between the attachment points on the corners of the flexible fabric sheet 200. If desired, a strap 140 may be extended across the taper area 135 to facilitate carrying or attachment to a fixed device on the vehicle such as a rear view mirror.

As previously indicated, the hubs may be made of a resilient, elastic material such as rubber, and the openings in the receptacles at the ends of the flexible hubs are stretched around the support members as the support members are inserted into the flexible hub. The connections between the body of the flexible hub and the receptacles for the support members serve as the flexible joint between the support members and the hub. These necks allow the support members 400 to pivot with respect to the body of the flexible hub. The flexible connections bias the sun shade into its open configuration where the flexible fabric sheet 200 is extended outwardly from the hub by the support members. The flexible connections will also allow the support members to pivot at the hub which enables the collapsible vehicle sun shade assembly to be reconfigured in a closed position where the flexible fabric sheet 200 is collapsed onto itself.

If desired, the hubs may be constructed in two halves from a rigid or semi-rigid material. In such construction, the hubs will typically include a central fastening aperture to accommodate a connector such as a fastening screw. Such construction is well known in the art. When a split hub construction is employed, such hubs will typically include support member grooves (not shown) to accommodate the support members. In such construction, each support member will include a hinge portion that fits into a support member groove in the hub. The hinge portion allows each support member to pivot with respect to the hub. The hinge portion of each support member is held in a support member groove in the hub when hub the two sections of the hub are joined together by fastening screw.

The support members may also include locking tabs (not shown). These locking tabs releasably engage locking grooves in the hub when the support members are extended radially from the hub to move the flexible fabric sheet 200 into its extended or open configuration. Each locking groove in the hub may further include a flexible tab. Resilient deformation of the flexible tabs within the locking grooves allows the locking tabs on each support member to releasably engage the locking grooves in the hub. Such construction is well known in the art.

In another embodiment (not shown), the locking grooves may be formed directly on slots in the support member. Resilient deformation of locking tabs in the hub allows the support members to be retained in an open or extended configuration.

Grooves to accommodate the support members may be located on a first half of the hub and shaped such that when the second half of the hub is fastened to the first half of the hub, the range of motion of the support member is limited by the second half of the hub. This relationship allows the support members to be pivoted between a closed configuration and an open configuration.

Still other embodiments shall fall within the scope of the following claims. Although the present invention has been described with reference to specific exemplary embodiments, various modifications and variations may be made to these embodiments without departing from the sprit and scope of the invention as set forth in the claims.

What is claimed is:

1. A collapsible vehicle sun shade assembly comprising:
    a sheet of a flexible fabric material having a central portion and a periphery;
    at least one hub located away from the central portion of the sheet;
    at least four support members, each of said at least four support members having a length, a first end connected to said at least one hub, and a second end attached to a predetermined location on said periphery of said flexible fabric sheet;
    wherein the collapsible vehicle sun shade assembly has an open configuration when said flexible fabric sheet is extended outwardly from said at least one hub by said at least four support members, and the extended flexible fabric sheet defines a plane in which all of said support members substantially lie;
    wherein the collapsible vehicle sun shade assembly has a closed configuration when the flexible fabric sheet is collapsed about said at least one hub by pivoting said at least four support members out of the plane;
    wherein the collapsible vehicle sun shade assembly is free of any support member oriented substantially perpendicular to the plane when the sun shade is in the open configuration.

2. The collapsible vehicle sun shade assembly as defined in claim 1, wherein the length of at least one of said at least four support members is longer than an adjacent length of said flexible fabric sheet measured from said at least one hub to said predetermined location on said periphery of said flexible fabric sheet.

3. The collapsible vehicle sun shade assembly as defined in claim 2, wherein said at least four support members are hingedly connected to said at least one hub.

4. The collapsible vehicle sun shade assembly as defined in claim 1, wherein said at least one hub is secured to said flexible fabric sheet.

5. The collapsible vehicle sun shade assembly as defined in claim 1, wherein said flexible fabric sheet is formed in the shape of a rectangle and each of said at least four support members extends from said at least one hub to a corner of said flexible fabric sheet.

6. The collapsible vehicle sun shade assembly as defined in claim 1, wherein said flexible fabric sheet is formed in the shape of a rectangle, and there are two hubs positioned on the flexible fabric sheet, wherein the first hub is positioned proximate the upper edge of said flexible fabric sheet, and the second hub is positioned proximate the lower edge of said flexible fabric sheet.

7. The collapsible vehicle sun shade assembly as defined in claim 1, wherein each of said at least four support members is joined to said at least one hub by placing an end of each of said at least four support members into an opening in said at least one hub.

8. The collapsible vehicle sun shade assembly as defined in claim 1, wherein said at least one hub is made of a resilient material.

9. The collapsible vehicle sun shade assembly as defined in claim 1, wherein said at least four support members are made of a resilient material.

10. The collapsible vehicle sun shade assembly as defined in claim 9, wherein said at least four support members are made from a material selected from the group consisting of metals and plastics.

11. The collapsible vehicle sun shade assembly as defined in claim 9, wherein each of said at least four support members have spring like properties.

12. The collapsible vehicle sun shade assembly as defined in claim 1, wherein each of said at least four support members is secured to the outer periphery of said flexible fabric sheet by a method selected from the group consisting of stitching, riveting, stapling, and gluing.

13. The collapsible vehicle sun shade assembly as defined in claim 1, wherein each of said at least four support members extends from said at least one hub to a pocket formed on said flexible fabric sheet.

14. The collapsible vehicle sun shade assembly as defined in claim 1, wherein each of said at least four support members has a hinged connection where each of said at least four support members connects to said at least one hub.

15. The collapsible vehicle sun shade assembly as defined in claim 14, wherein said hinged connection is a releasable locking connection.

16. The collapsible vehicle sun shade assembly as defined in claim 1, wherein each of said at least four support members is covered with a cushion-like material.

17. The collapsible vehicle sun shade assembly as defined in claim 1, wherein the vehicle sun shade, when extended, has a shape selected from the group consisting of a square, a rectangle, a trapezoid, a circle and an oval.

18. The collapsible vehicle sun shade assembly as defined in claim 1, wherein the collapsible vehicle sun shade assembly, when extended, has a perimeter so dimensioned to be adaptable for completely shading a vehicle window.

19. The collapsible vehicle sun shade assembly as defined in claim 1, wherein said flexible fabric sheet is made from a material which reflects light and heat radiation.

20. The collapsible vehicle sun shade assembly as defined in claim 1, further including a tapered area adapted to accommodate a rear-view mirror.

21. The collapsible vehicle sun shade assembly as defined in claim 1, further including a carrying strap.

22. A collapsible vehicle sun shade assembly comprising:
a sheet of a flexible fabric material, said sheet of flexible fabric material having an outer edge and front and back surfaces;
at least one hub positioned away from the center of said flexible fabric sheet;
at least five support members, each of said at least five support members having a length, a first end and a second end;
said length of said at least five support members being longer than an adjacent length of said flexible fabric sheet;
wherein the collapsible vehicle sun shade assembly has an open configuration when at least three of said at least five flexible support members extend from said at least one hub to a predetermined connection point on said outer edge of said flexible fabric material; and the remainder of said at least five flexible support members extend between predetermined connection points on said outer edge of said flexible fabric material, and the extended flexible fabric sheet defines a plane in which all of said support members substantially lie,
wherein the collapsible vehicle sun shade assembly has a closed configuration when the flexible fabric sheet is collapsed about said at least one hub by pivoting said at least four support members out of the plane,
wherein the collapsible vehicle sun shade assembly is free of any support member oriented substantially perpendicular to the plane when the sun shade is in the open configuration.

23. A collapsible vehicle sun shade assembly comprising:
a sheet of a flexible fabric material;
at least one hub positioned away from the center of said flexible fabric sheet;
at least four support members, each of said at least four support members having a joint end, each joint end being flexibly connected to said at least one hub by a releasable locking joint, each of said at least four support members extending radially from said at least one hub to a secured position on said flexible fabric sheet;
wherein the collapsible vehicle sun shade assembly has an open configuration when said flexible fabric sheet is extended by said at least four support members, and the extended flexible fabric sheet defines a plane in which all of said support members substantially lie,
wherein the collapsible vehicle sun shade assembly has a closed configuration when said flexible fabric sheet is collapsed by pivoting said at least four support members out of the plane,
wherein the collapsible vehicle sun shade assembly is free of any support member oriented substantially perpendicular to the plane when the sun shade is in the open configuration.

24. A collapsible vehicle sun shade assembly comprising:
a sheet of a flexible fabric material, said sheet having a peripheral edge and front and back surfaces;
at least one hub positioned away from the center of said flexible fabric sheet;
at least four support members, each of said at least four support members having a joint end, each joint end being flexibly connected to said at least one hub by a releasable locking joint, each of said at least four support members extending outwardly from said at least one hub to a secured position on said flexible fabric sheet; and
the length of at least one of said at least four support members being longer than an adjacent length of sheet measured from said at least one hub to said secured position on said flexible fabric sheet;
wherein the collapsible vehicle sun shade assembly has an open configuration wherein said at least four support members are pivoted with respect to said at least one hub to extend the sheet and lock said releasably locking joints, and the extended sheet defines a plane in which all of said support members substantially lie,
wherein the collapsible vehicle sun shade assembly has a closed configuration when the sheet is collapsed about said at least one hub by pivoting said at least four support members out of the plane,
wherein the collapsible vehicle sun shade assembly is free of any support member oriented substantially perpendicular to the plane when the sun shade is in the open configuration.

25. A collapsible vehicle sun shade assembly comprising:
a sheet of a flexible fabric material, said flexible fabric sheet having an outer edge and front and back surfaces;
at least one hub positioned away from the center of said flexible fabric sheet;
at least four support members, each of said at least four support members being flexibly connected to said at least one hub by a hinge, each of said at least four support members extending outwardly from said at least one hub to a secured position on said outer edge of said flexible fabric sheet;
wherein the collapsible sun shade assembly has an open configuration when said at least four support members are pivoted with respect to said at least one hub to extend said flexible fabric sheet and releasably lock the collapsible vehicle sun shade assembly in an open configuration, and the extended flexible fabric sheet defines a plane in which all of said support members substantially lie;
wherein the collapsible vehicle sun shade assembly has a closed configuration when the flexible fabric sheet is collapsed about said at least one hub by pivoting said at least four support members out of the plane,
wherein the collapsible vehicle sun shade assembly is free of any support member oriented substantially perpendicular to the plane when the sun shade is in the open configuration.

* * * * *

UNITED STATES PATENT AND TRADEMARK OFFICE
CERTIFICATE OF CORRECTION

PATENT NO:     6,135,191                          Page 1 of 2

DATED:         October 24, 2000

INVENTOR(S):   Edward David Mitchell, Roger King, John Charles Cook, and Scott Paul McManigal It is certified that errors appear in the above-identified patent and that said Letters Patent are hereby corrected as shown below:

Col. 1, line 46, after "support members are connected" delete "to" and insert --on--.

Col. 1, line 60, after "tion permits rearrangement" insert --to--.

Col. 2, line 28, delete "Nylons" and insert --Nylon®--.

Col. 2, line 31, after "Preferably" insert --,--.

Col. 2, line 35, before "materials" insert --of--.

Col. 2, line 63, after "tially rigid materials are used" insert --,--.

Col. 3, line 15, after "are positioned to move the fabric sheet" delete ",".

Col. 3, line 51, after "100 according to the present invention" insert --and--.

UNITED STATES PATENT AND TRADEMARK OFFICE
CERTIFICATE OF CORRECTION

PATENT NO: 6,135,191

DATED: October 24, 2000

INVENTOR(S): Edward David Mitchell, Roger King, John Charles Cook, and Scott Paul McManigal It is certified that errors appear in the above-identified patent and that said Letters Patent are hereby corrected as shown below:

Col. 4, line 59, delete "comers" and insert --corners--.

Col. 5, line 28, after "groove in the hub when" delete "hub".

Col. 5, line 45, before "when" insert ",".

Col. 5, line 55, delete "sprit" and insert --spirit--.

Col. 6, line 52, delete "spring like" and insert --spring-like--.

Col. 7, line 40, after "all of said support members substantially lie" delete "," and insert --.--.

Col. 7, line 44, after "at least four support members out of the plane" delete "," and insert --.--.

Signed and Sealed this

Twenty-second Day of May, 2001

*Attest:*

NICHOLAS P. GODICI

*Attesting Officer*     Acting Director of the United States Patent and Trademark Office